Feb. 18, 1936.　　　　G. H. HILL, JR　　　　2,031,262
DISTRIBUTING APPARATUS
Filed May 18, 1933　　　3 Sheets-Sheet 3
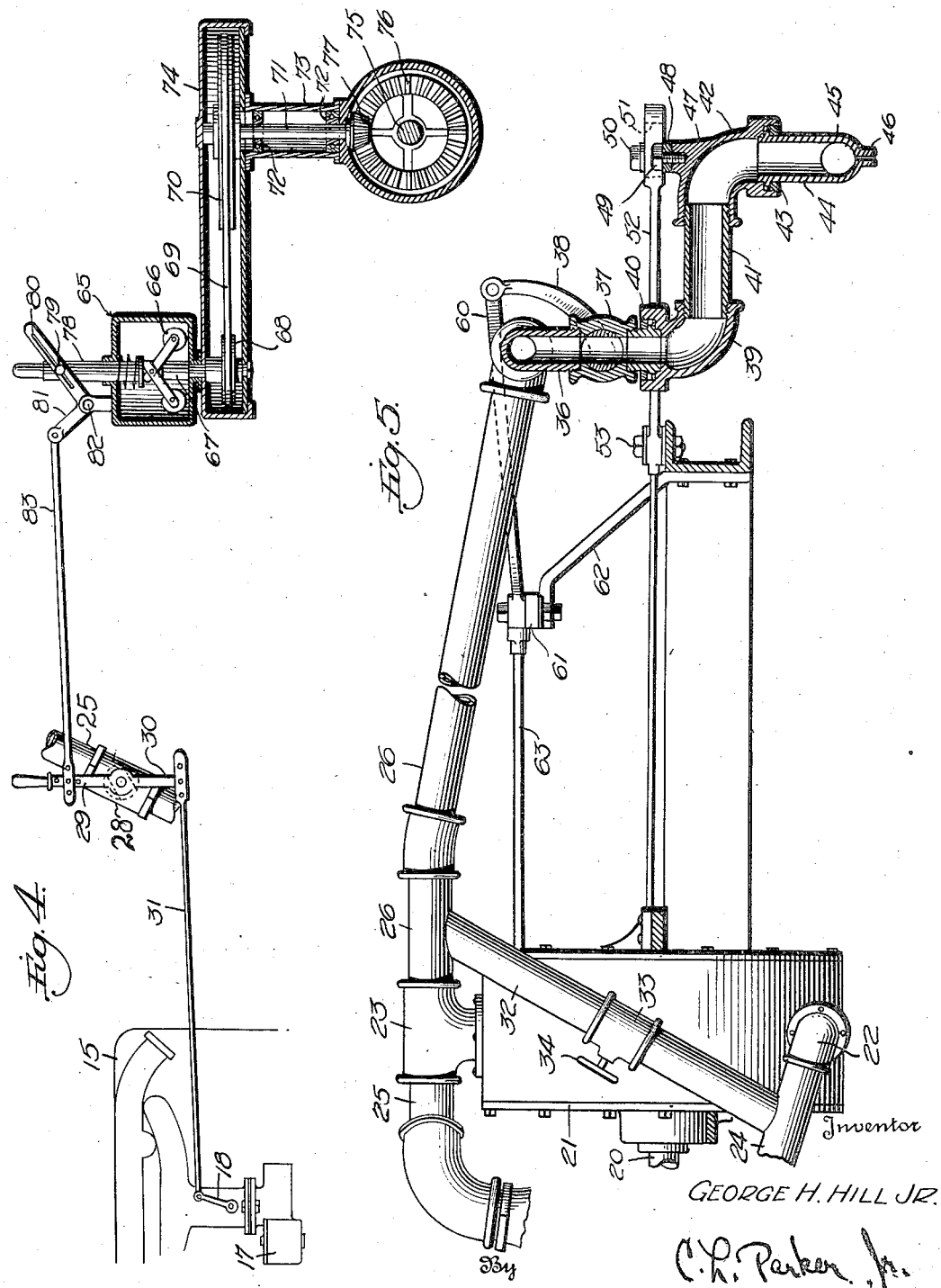
Inventor
GEORGE H. HILL JR.

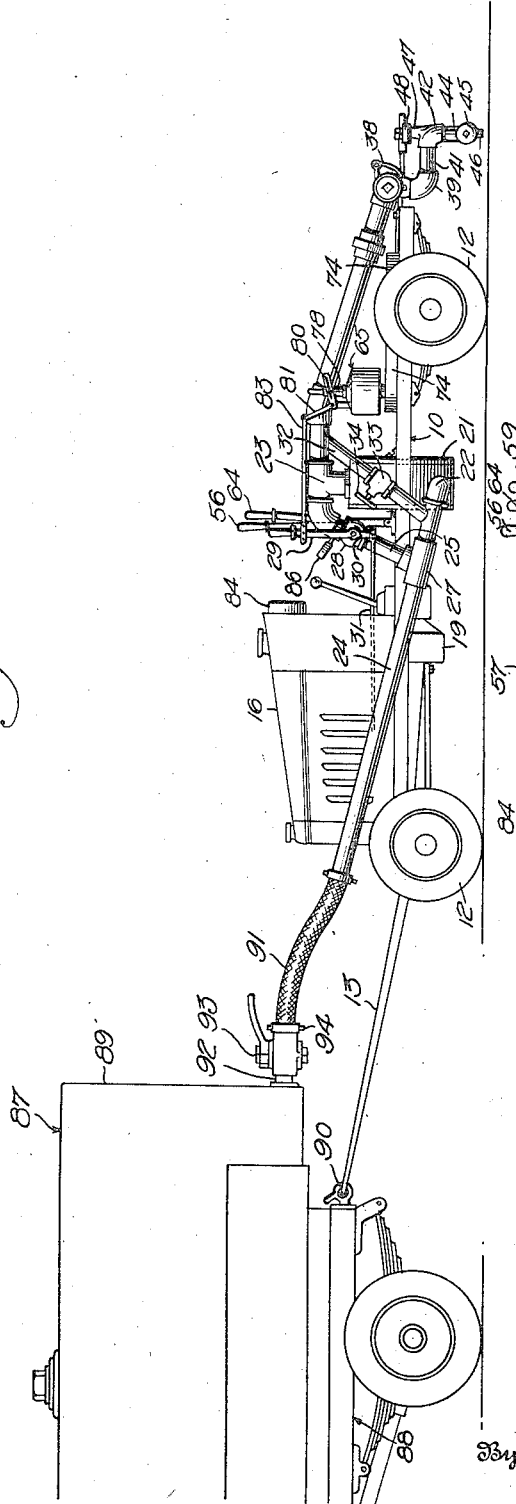

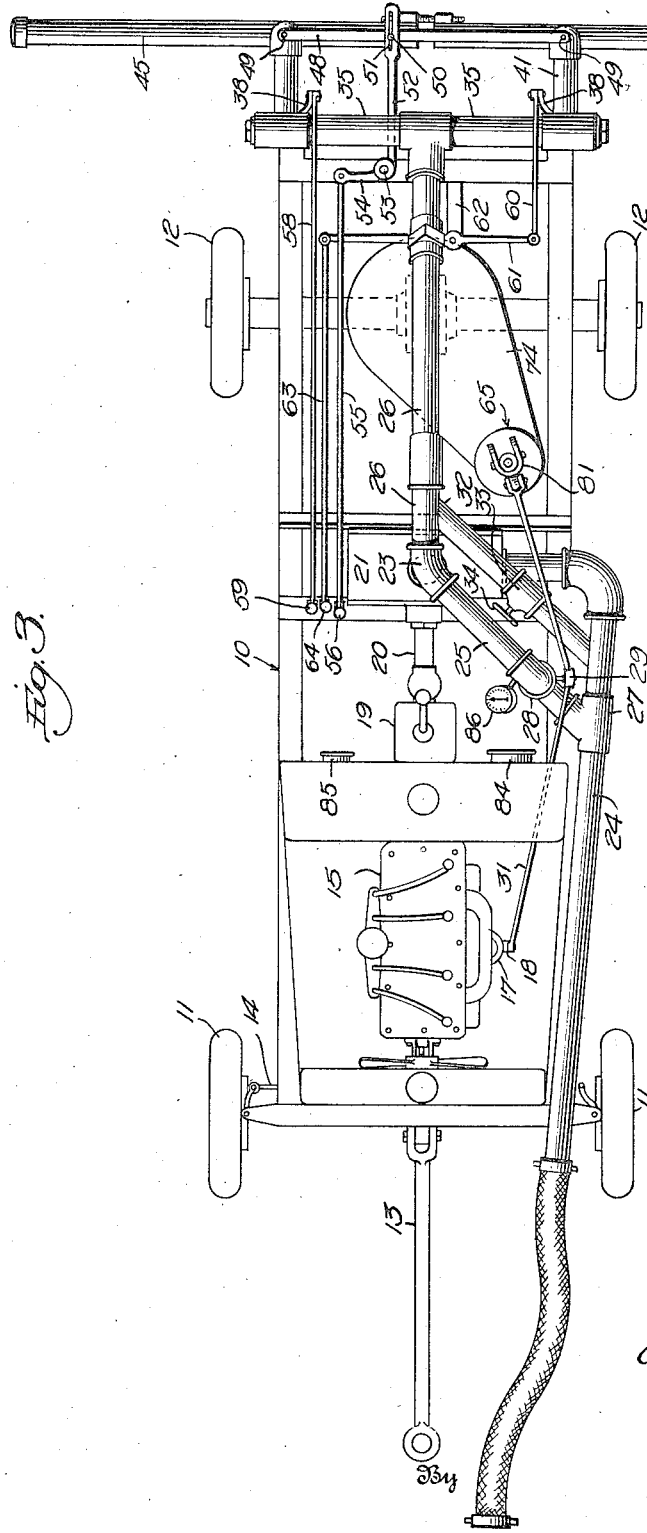

Patented Feb. 18, 1936

2,031,262

UNITED STATES PATENT OFFICE 2,031,262

DISTRIBUTING APPARATUS

George H. Hill, Jr., Parkersburg, W. Va.

Application May 18, 1933, Serial No. 671,725

5 Claims. (Cl. 299—34)

This invention relates to mobile distributing apparatus, and more particularly to an apparatus for distributing liquid or fluid materials to streets, highways and the like.

It is the common practice to apply materials such as oils, tars, asphalts, emulsions, water and various types of solutions to streets, roads, highways, airplane landing fields and other surfaces by pumping the materials through suitable spray or similar devices. The usual type of equipment for this purpose is very cumbersome and expensive and consists of a motor truck chassis upon which is mounted a tank and a motor driven pump, the function of the latter being to draw liquid from the tank and pass it under pressure through a system of pipes to a horizontal pipe or pipes arranged at right angles to the direction of travel at the rear of the truck a few inches above the ground. These horizontal pipes commonly known as "spray bars", are fitted with various types of nozzles having orifices shaped to produce overlapping sprays of the desired type.

The rate of application of material to the road or other surface ordinarily is manually controlled more or less inaccurately according to the speed of movement of the truck, the size of the nozzle orifices and the pressure at which the material is pumped through the orifices. In actual practice, material is supplied to the nozzles ordinarily at pressures of from 15 to 70 pounds per square inch according to the specifications covering the particular type of work being performed. The present forms of apparatus for the purpose referred to are objectionable for many reasons. For one thing, the apparatus including the tank, pumps and power plant are of such weight as to require a large, powerful, cumbersome and expensive truck for its transportation. Distributors of this type ordinarily weigh from 5 to 15 tons including the truck without the load. Gross weights with the tanks filled range from 7 to 20 tons for tank capacities up to 1500 gallons. Bridges are often encountered which will not carry these loads, often resulting in serious delays and heavy additional expense for transportation. Legal load limits on roads often hamper the operation of such equipment and heavy distributors frequently cause severe damage to surfaces under construction by dislodging the materials composing the surface after they have been shaped but not thoroughly compacted pending the application of the desired binding agent by the distributor.

The investment involved in such apparatus and the cost of operation thereof is particularly high. The size of the truck and the equipment necessarily make the original cost relatively excessive, and at the same time the fact that the equipment is built as an integral part of the truck renders the latter not readily available for other uses when not in use as a distributor. Accordingly the substantial investment involved in the purchase of the apparatus is tied up without earning capacity for a substantial portion of each year and is directly chargeable to overhead when the equipment is not actually working because of breakdowns, seasonal shut-downs, or lack of sufficient work to keep the equipment employed.

Moreover, in addition to the heavy initial expense involved in the purchase of the apparatus, the actual operating costs are extremely high due to the heavy consumption of fuel and oil, the replacement of expensive tires, the making of costly repairs and the high operating license fees required in most of the States. Because of their weight and nature, the distributors commonly employed usually are not capable of speeds as high as twelve miles per hour, and usually such apparatus cannot be employed at speeds greater than six miles per hour except for very light applications of material.

When empty, the distributing tanks must be refilled from transport or auxiliary trucks used solely for transporting the liquid from the source of supply to the point of application. The refilling operation requires from 5 to 15 minutes and consequently involves a direct loss of time. Moreover, the rate of application is maintained through manual control, as previously stated, and precise operation is necessary on the part of the truck driver and control operator to secure relatively even distribution of the material at the desired rate. Accordingly it is necessary to rely upon the judgment and observation of the operators, thus requiring the employment of skilled operators at relatively high salaries, and such operators are not readily procurable at all times.

The principal object of the present invention is to overcome the many disadvantages of the usual types of equipment used for applying binding or other materials to roads or other surfaces by employing a novel type of apparatus having a relatively low initial cost and a relatively low operating cost.

A further object is to provide a distributing mechanism which is automatic in operation for making applications of materials to road and other surfaces at a rate proportionate to the linear speed of travel of the distributing apparatus.

A further object is to provide a trailer type of distributor which is readily attachable to a transfer or transport truck for pumping material directly from such truck to the road or other surface without the necessity of transferring the liquid from the transport truck to the tank of a distributing truck.

A further object is to provide a distributing apparatus of the type referred to including a pump and a source of power therefor, and to provide means for controlling the speed of operation of the power source to distribute material to a road or other surface at a rate proportionate to the linear speed of travel of the distributing apparatus.

A further object is to provide an apparatus of the character referred to having a by-pass connected between the intake and outlet sides of the pump, and to provide means for controlling the passage of liquid through the by-pass to determine the net rate of flow of the material through the distributing nozzles in accordance with the linear speed of movement of the apparatus.

A further object is to provide a blow off or safety valve connected between the intake and outlet sides of the pump and adapted to be opened automatically to take care of material pumped in excess of the rate of discharge through the distributing nozzles when some of the nozzles are disconnected from the pump or in the event that some of the nozzles become clogged.

Other objects and advantages of the invention will become apparent during the course of the following description.

In the drawings I have shown one embodiment of the invention. In this showing:

Figure 1 is a side elevation of the distributing apparatus showing a portion of the transfer truck, Figure 2 is a rear elevation of the distributing apparatus, Figure 3 is a plan view of the same, the hood of the trailer being removed, Figure 4 is a vertical sectional view through the governor drive mechanism showing associated parts connected thereto in elevation, and, Figure 5 is a section taken substantially on line 5—5 of Figure 2, parts being shown in elevation.

Referring to the drawings, the numeral 10 designates a trailer chassis supported upon forward wheels 11 and rear wheels 12. The trailer may be of any desired type, but is preferably of the automotive type wherein the forward wheels turn on the usual spindles. A tongue or draft connection 13 is connected at its rear end to the tie rod 14 extending between the wheels 11 so that the latter will steer in accordance with the movement of the draft connection for a purpose to be described.

The trailer carries a power source 15 preferably in the form of an automotive type internal combustion engine, and this engine is preferably covered by a hood 16, as shown in Figure 1. The engine 15 includes a carburetor 17 having a throttle control 18 operable in a manner to be referred to. The engine is provided with a transmission unit 19 of the usual automotive type preferably including a clutch and transmission gears although it will become apparent that any suitable form of power transmission may be connected to the engine. From the transmission 19 a shaft 20 extends rearwardly to drive a pump 21. This pump may be of any desired capacity, but for general use it is preferred that it be capable of handling ten thousand gallons of liquid per hour at pressures up to two hundred pounds per square inch. The particular structure of the pump per se forms no part of the present invention, and accordingly the pump has not been illustrated in detail.

The pump is provided with inlet and outlet connections 22 and 23 respectively, and the former is connected to an intake pipe 24 leading forwardly and upwardly and supported in any suitable manner adjacent the forward end of the trailer if desired. Liquid is supplied to the forward end of the pipe 24 in a manner to be described. The outlet connection 23 is preferably in the form of a T as shown in Figures 1, 3, and 5. The upper branches of the T are connected respectively to pipes 25 and 26, the former comprising a by-pass extending from the outlet connection 23 to the pipe 24 and connected to the latter by a T 27. A quick acting gate valve 28 is arranged in the pipe 25 and is operable by a suitable lever connected intermediate its ends to the valve and including upwardly and downwardly extending arms 29 and 30 respectively. A rod 31 is connected at its rear end to the lower end of the arm 30 and at its forward end the rod is connected to the throttle arm 18 whereby the throttle is operated simultaneously with the valve 28.

A by-pass 32 is connected between the pipes 26 and 24 and a pressure operated by-pass valve 33 is arranged in this by-pass. The valve 33 is preferably adjustable to operate at the desired pressure by controlling an operating handle 34. Any desired type of safety valve 33 may be employed for connecting the pipe 26 to the pipe 24 upon the accumulation of a predetermined pressure in the pipe 26.

The pipe 26 extends toward the rear end of the distributing apparatus for connection to oppositely extending branches 35. The outer ends of these branches have downwardly extending connections 36 and each connection leads to a valve 37 having an operating arm 38. Each valve 37 leads to a lower elbow 39 and is connected thereto by a swivel connection 40 to permit the elbows 39 to swing on a vertical axis. The lower end of each elbow 39 is connected by a pipe 41 to an elbow 42 and this elbow is joined by a swivel connection 43 to an upstanding tubular member 44 leading to a spray bar 45. Each spray bar is shown as being provided with downwardly projecting nozzles 46 for projecting sprays of liquid from the spray bars to the road or other surface. The spray bars may be of any desired type, and they form, per se, no part of the present invention.

Each elbow 42 is provided with an upstanding boss 47 and a connecting bar 48 extends between the two bosses and has its ends pivotally connected thereto as at 49. Intermediate its ends, the rod 48 is provided with an upstanding pin or screw 50 extending through a slot 51 formed in the rear arm 52 of a bell crank lever pivotally supported intermediate its ends on the frame of the vehicle as at 53. The other arm 54 of the bell crank lever is pivotally connected to the rear end of a rod 55, and this rod is operable by a lever 56 arranged adjacent the operator's seat 57 (see Figure 2).

The valves 37 also are adapted to be controlled from a point adjacent the driver's seat. The arm 38 of one of the valves 37 is pivotally connected to one end of a rod 58 and this rod leads to an operating lever 59 arranged adjacent the operator's seat. The arm 38 of the other valve 37 is pivotally connected to the rear end of a rod 60, and the forward end of this rod is pivotally connected to one end of a lever 61. This lever is pivotally supported intermediate its ends by a bracket 62, and the other end of the lever is pivotally connected to the rear end of a rod 63, leading to an operating lever 64 arranged adjacent the driver's seat.

Referring to Figures 1, 2, 3, and 4, the numeral 65 designates a governor of any suitable or desired type, shown in the present instance as being of the flyball type including weights 66 rotatable by a shaft 67. This shaft is adapted to be driven in any desired manner by the vehicle so as to rotate at a speed proportionate to the linear speed of travel of the vehicle. In the present instance, the shaft 67 is shown as being provided with a pulley or sprocket 68 about which passes a belt or chain 69. The driving element referred to passes around a pulley or sprocket 70 mounted on a vertical shaft 71 and this shaft may be supported in bearings 72 arranged in a vertical housing 73. The driving means between the shafts 67 and 71 may be arranged in a suitable housing 74, as shown in Figure 4.

The rear wheels 12 of the vehicle are mounted on axles or shafts 75 and one or both of these axles may be provided with bevel gears 76 meshing with a bevel pinion 77 arranged on the lower end of the shaft 71. It will be apparent that the transmission means between the axle or axles 75 and the shaft 67 rotates the weight elements of the governor at a speed proportionate to the linear speed of travel of the trailer.

As previously stated, any suitable type of governor may be employed and accordingly the governor illustrated need not be referred to in detail. It will be apparent that the governor includes a vertically movable sleeve 78 responsive to the movement of the weight members 66. The sleeve 78 carries a pin 79 operating in a slot 80 formed in one end of a bell crank lever 81. This lever is supported intermediate its ends as at 82 upon the housing of the governor, and the other end of the lever is pivotally connected to one end of a rod 83. The other end of the rod 83 is pivotally connected to the arm 29 connected to the valve 28. Accordingly it will be apparent that operation of the valve 28 takes place automatically in accordance with the operation of the governor 65.

The trailer is preferably provided with various types of desirable indicating devices. For example, a tachometer 84 is preferably arranged on the dash of the vehicle to indicate the speed of the motor 15, and a speedometer 85 is preferably employed to indicate vehicle speed. A pressure gage 86 is employed for indicating the pressure at the outlet side of the pump and this gage may be connected to the pipe 25 above the valve 28 at which point it is readily visible to an operator occupying the seat 57.

Referring to Figure 1, the numeral 87 designates a transport truck as a whole including a chassis 88 having a tank 89 supported thereon in any suitable manner. The tank is preferably removably secured to the chassis in order that the truck may be used for purposes other than the transporting of liquids thus increasing the period of usefulness of the truck. The draft connection 13 is connected to the rear end of the truck chassis by a quick detachable coupling 90. As previously stated, the draft connection 13 is preferably connected to the tie rod 14 of the trailer whereby the latter is caused to track with respect to the transport truck without being steered.

The forward end of the pipe 24 is connected to the rear end of a flexible connection 91, preferably in the form of a flexible metal covered hose. The tank 89 is provided with an outlet connection 92 controlled by a manually operable valve 93, and the outlet connection of the valve is provided with a quick acting coupling 94 by means of which it may be connected to the forward end of the hose 90.

The operation of the apparatus is as follows:

The truck 87 is adapted to transport liquids from the source of supply to the point of application. In treating road surfaces, for example, the truck 87 is loaded with oil, asphalts or other materials at the source of storage and is then driven to the point of application of the material on the road. The trailer 10 is ready for operation at the point of application and the draft connection 13 is connected to the coupling 90, and the forward end of the hose 91 is connected to the valve 93 by the coupling 94. The valve 93 is then opened, whereupon the entire apparatus is ready for operation. It will be apparent that the quick acting couplings 90 and 94 require but a few seconds for their operation, and the transport truck is ready to be driven over the road surface almost immediately after it reaches the point where the material is to be applied to the road. Thus a material saving in time is effected over the usual practice of transferring the liquid from the transport truck tank to the tank of the distributing apparatus, and the cost of the distributing truck is eliminated by the use of the lighter, simpler and less expensive trailer 10.

The transport truck is driven over the road surface to be treated and the operator occupying the seat 57 controls the various manually operable mechanisms for distributing the material to the road. For example, assuming that material is to be distributed throughout the length of the spray bars, both of the levers 59 and 64 are operated to open both valves 37. Irregularities in the road edge and in the movement of the trailer are compensated for by operating the lever 56. Operation of this lever swings the bell crank lever 84 to spring the rear end 52 of such lever laterally with respect to the trailer, thus transmitting movement to the rod 49. This rod is pivotally connected to the elbows 42 and the spray bars are free to swing laterally by virtue of the use of the swivel connections 40 and 43. The motor 15 operates through its transmission connections to drive the pump 21, and the pump operates to withdraw oil from the bank 89 through the hose connection 91 and inlet pipe 24, the oil being pumped under pressure outwardly through the connection 23. The oil thus pumped passes rearwardly through the pipe connection 26 from which it flows through the branch connections 35 and thence downwardly through the connections 36, valves 37 and the several piping connections associated therewith, to the spray bars 45, and the liquid is discharged to the road surface through the nozzles 46. Either spray bar may be rendered inoperative by closing its valve 37, and this operation is accomplished by movement of either of the levers 59 or 64.

If the motor 15 is operated while the valves 37, or either of them, are closed the accumulation of pressure in the outlet side of the pump is taken care of by the pressure operated by-pass valve 33 which is set to open at a predetermined pressure to connect the pipe 26 to the pipe 24. The liquid thus pumped is accordingly by-passed to the inlet side of the pump for recirculation therethrough without causing any damage to the apparatus. The pipe 25 also acts as a by-pass between the outlet and inlet sides of the pump, but this by-pass is controlled in accordance with the linear speed of travel of the vehicle. As previously stated, the movement of the governor sleeve 78 is proportionate to the vehicle speed and moves downwardly as the vehicle speed increases. Under such conditions it is desirable to increase the rate of application of the material to the road. Such downward movement of the sleeve 78 swings the bell crank lever 81 to exert a pull on the rod 83, and this movement is transmitted to the valve 28 through the arm 29 to progressively close the valve and limit the by-passing of liquid therethrough. This action results in a greater proportion of the pumped liquid passing rearwardly through the pipe 26 and its associated connections leading to the spray bars.

In a similar manner, a decrease in vehicle speed results in upward movement of the sleeve 78 to progressively open the valve 28 and increase the by-passing of liquid from the outlet to the inlet side of the pump. This action obviously decreases the proportionate supply of liquid to the spray bars. It will be apparent that the valve 28 is a quick acting gate valve, and the governor is substantially instantaneously responsive to variations in vehicle speed. Accordingly the valve 28 operates to promptly increase or decrease the application of material to the road or other surface upon a change in vehicle speed. At the same time, it is desirable to provide economy in operation of the motor 15 by preventing it from operating to pump at a greatly excessive rate. Accordingly the lower valve arm 30 is connected by the rod 31 to the throttle connection 18, and upon an increase in vehicle speed the engine speed is increased, while the converse is true if the vehicle speed decreases, the rod 31 operating to partially close the throttle. Accordingly it will be apparent that the variations in the discharge of liquid through the spray bar nozzles in accordance with variations in vehicle speed are taken care of partly through variations in the by-passing of liquid through the pipe 25 and partly through changing the speed of the engine 15. If desired, the valve 28 may be designed to control the variations between the minimum and maximum discharge of liquid from the spray bar nozzles, but it is preferred that the engine speed be also controlled in the interests of economy in the operation of the motor and for the additional purpose of positively preventing the overloading of the pump 21.

From the foregoing it will be apparent that the present apparatus constitutes a substantial improvement over prior forms of distributing apparatus adapted for the same use. In the first place, the rate of distribution with the present apparatus is wholly automatic, means being provided for discharging material to a road or other surface in accordance with the vehicle speed. By providing suitable adjustments in the automatic control members, such as adjustments in the connection between the rod 83 and lever arm 29 and in the connections between the rod 39 and either the lever arm 30 or throttle arm 18, variations in the rate of application for a given vehicle speed can be obtained. The automatic operation eliminates the necessity for the use of judgment on the part of the operator, thus permitting the use of unskilled operators. However, if desired, under unusual conditions, the connection between the rod 83 and arm 29 may be detachable to permit manual control of the valve 28.

The use of the trailer apparatus in place of the usual distributing truck permits the use of a much cheaper piece of equipment, thus reducing the necessary investment. Moreover, the necessity for transferring oil from the transport truck to a distributing truck tank is eliminated, and as a transport truck is emptied, it may be stopped, disconnected from the trailer and replaced by a filled truck. Further application of material to the road or other surface can then immediately proceed while the first transport truck may be driven to the source of supply to be refilled. The absence of the distributing apparatus on the tank truck permits the tank to be detachably connected to the truck whereby the latter may be used for other purposes, thus increasing its field of usefulness.

By distributing the total weight of the equipment between the transport truck and the trailer, legal load limits are not exceeded and there is much less likelihood of damage to materials composing the surface of a road which has not been thoroughly compacted. Moreover, the cost of applying the material to the road surface is materially reduced for several reasons, namely, because of the lower necessary investment, the saving of time incident to transferring liquid from transport to distributing trucks, the cheapness of operation of the pump, the reduction in losses due to seasonal shut-downs, etc. In actual practice it has been found that the application of binding materials and the like to road surfaces can be carried out at a cost of approximately one-fourth of the cost with the present types of apparatus.

The light weight of the trailer and its equipment permits it to be moved at high speeds from one job to another, and it may be towed behind either a passenger car or a truck. The apparatus is useful for many purposes such as the distribution of water, oil, emulsions or other liquids to highways, roads, streets and airplane landing fields and it is applicable for the cold application of asphalts, tars, etc. to similar surfaces. It is also adapted for use in flushing or washing pavements, highways, etc. while it may be used purely as a pumping apparatus as distinguished from distributing apparatus in such uses as transferring liquids from tank cars to storage or transport tanks, pumping out coffer dams, basements, excavations, etc. It will be apparent that the many uses to which the apparatus may be put materially reduces its period of idleness thus creating a material saving in the cost of the work for which it is intended.

While the apparatus as a whole has been illustrated and described in connection with a truck and trailer assembly with the pumping apparatus carried by the trailer, it will be apparent from the foregoing description that the invention is not so limited, so far as the pumping apparatus per se is concerned. For example, it will be apparent that the pump and its power source together with the pressure operated by-pass and/or the by-pass controlled in accordance with vehicle speed may be mounted upon a tank truck together with means, such as the means illustrated, for controlling the latter by-pass and/or the speed of the pump motor from any wheel of the truck or any part rotated by or with such wheel.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus of the character described comprising a vehicle, a pump mounted on said vehicle and provided with a fluid intake, a distributing pipe forming the outlet of said pump, a by-pass connecting said fluid intake and said distributing pipe, a valve controlling the passage of fluid from said distributing pipe to said intake through said by-pass, control means operatively connected to the vehicle, means actuated by said control, means for progressively opening and closing said valve upon the respective deceleration and acceleration of the vehicle speed, and a source of power for said pump, said last-named means being operatively connected to a means for accelerating and decelerating the speed of said power source upon the respective acceleration and deceleration of the vehicle speed.

2. Apparatus of the character described comprising a vehicle, a pump mounted on said vehicle and provided with a fluid intake, a distributing pipe forming the outlet of said pump, a by-pass connecting said fluid intake and said distributing pipe, a valve controlling the passage of fluid from said distributing pipe to said intake through said by-pass, means for progressively opening and closing said valve upon the respective deceleration and acceleration of the vehicle speed, a second by-pass connected between said distributing pipe and said intake, and a pressure operated by-pass valve in said second by-pass operative upon a predetermined accumulation of pressure in said distributing pipe.

3. Apparatus of the character described comprising a vehicle, a pump mounted on said vehicle and provided with a fluid intake, a distributing pipe forming the outlet of said pump, a by-pass connecting said fluid intake and said distributing pipe, a valve controlling the passage of fluid from said distributing pipe to said intake through said by-pass, control means operatively connected to the vehicle, means actuated by said control, means for progressively opening and closing said valve upon the respective deceleration and acceleration of the vehicle speed, a source of power for said pump, said last-named means being operatively connected to a means for accelerating and decelerating the speed of said power source upon the respective acceleration and deceleration of the vehicle speed, a second by-pass connected between said distributing pipe and said intake, and a pressure operated by-pass valve in said second by-pass operative upon a predetermined accumulation of pressure in said distributing pipe.

4. Apparatus of the character described comprising a vehicle, a pump mounted on said vehicle and provided with a fluid intake, a distributing pipe forming the outlet of said pump, a by-pass connecting said fluid intake and said distributing pipe, a valve controlling the passage of fluid from said distributing pipe to said intake through said by-pass, control means operatively connected to the vehicle, means actuated by said control, means for progressively opening and closing said valve upon the respective deceleration and acceleration of the vehicle speed, an internal combustion engine connected to said pump, and an arm for operating the engine throttle, said last named means being operatively connected to said arm for progressively opening and closing the engine throttle upon the respective acceleration and deceleration of the vehicle speed.

5. Apparatus of the character described comprising a vehicle, a pump mounted on said vehicle and provided with a fluid intake, a distributing pipe forming the outlet of said pump, a by-pass connecting said fluid intake and said distributing pipe, a valve controlling the passage of fluid from said distributing pipe to said intake through said by-pass, control means operatively connected to the vehicle, means actuated by said control, means for progressively opening and closing said valve upon the respective deceleration and acceleration of the vehicle speed, an internal combustion engine connected to said pump, an arm for operating the engine throttle, said last named means being operatively connected to said arm for progressively opening and closing the engine throttle upon the acceleration and deceleration of the vehicle speed, a second by-pass connected between said distributing pipe and said intake, and a pressure operated by-pass valve in said second by-pass operable upon the accumulation of a predetermined pressure in said distributing pipe.

GEORGE H. HILL, Jr.